United States Patent
Xu et al.

(10) Patent No.: US 9,830,789 B2
(45) Date of Patent: Nov. 28, 2017

(54) CEILING MOUNT INTRUSION DETECTOR WITH ARBITRARY DIRECTION DETECTION CAPABILITY

(71) Applicant: Honeywell International Inc., Morristown, NJ (US)

(72) Inventors: Haidong Xu, Shenzhen (CN); Jie Zhao, Shenzhen (CN); Guobin Xu, Shenzhen (CN); Di Wu, Shenzhen (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/982,787

(22) Filed: Dec. 29, 2015

(65) Prior Publication Data

US 2017/0186289 A1 Jun. 29, 2017

(51) Int. Cl.
   G08B 13/18 (2006.01)
   G08B 13/19 (2006.01)
   G01J 5/34 (2006.01)
   G01J 5/08 (2006.01)
   G02B 3/08 (2006.01)

(52) U.S. Cl.
   CPC .......... G08B 13/19 (2013.01); G01J 5/0806 (2013.01); G01J 5/34 (2013.01); G02B 3/08 (2013.01)

(58) Field of Classification Search
   CPC combination set(s) only.
   See application file for complete search history.

(56) References Cited

U.S. PATENT DOCUMENTS

| | | | |
|---|---|---|---|
| 1,955,597 A * | 4/1934 | Lamblin-Parent | F21S 48/1225 362/235 |
| 4,321,594 A | 3/1982 | Galvin et al. | |
| 5,451,931 A * | 9/1995 | Muller | G08B 17/113 250/573 |
| 5,557,106 A | 9/1996 | Ioco | |
| 6,211,522 B1 | 4/2001 | Kotlicki et al. | |
| 6,377,183 B1 * | 4/2002 | Baker | G08B 17/107 250/574 |
| 2012/0229283 A1 * | 9/2012 | McKenna | G08B 17/06 340/584 |
| 2013/0043396 A1 | 2/2013 | Shpater | |
| 2017/0053508 A1 * | 2/2017 | Urrutia | G08B 17/10 |

FOREIGN PATENT DOCUMENTS

EP   0 484 293 A2   5/1992

OTHER PUBLICATIONS

Extended European search report from corresponding EP patent application 16203911.9, dated May 12, 2017.

* cited by examiner

Primary Examiner — Travis Hunnings
(74) Attorney, Agent, or Firm — Husch Blackwell LLP (57) ABSTRACT

A ceiling mount intrusion detector with arbitrary direction detection capability is provided. The detector can include a pyroelectric sensor and a unitary Fresnel lens such that the unitary Fresnel lens includes a first piece of a first full Fresnel lens and a second piece of a second full Fresnel lens and such that the first piece and the second piece are spliced together. Due to dimensions and location of the unitary Fresnel lens relative to the sensor, the sensor can output a signal indicative of an alarm condition when an object passes in front of the unitary Fresnel lens at any angle relative to the sensor.

14 Claims, 10 Drawing Sheets

Strong Direction

Peak-Valley: 2.3123uW

Weak Direction

Peak-Valley: 0.0131uW

| I | II | III | IV | V | VI | VII | VIII |
|---|---|---|---|---|---|---|---|
| 0° | 22.5° | 45° | 67.5° | 90° | 112.5° | 135° | 157.5° |
| 0.6938 | 0.9287 | 1.3045 | 0.9863 | 1.1916 | 0.9759 | 1.6002 | 1.2242 |

CEILING MOUNT INTRUSION DETECTOR WITH ARBITRARY DIRECTION DETECTION CAPABILITY

FIELD

The present invention relates generally to ceiling mount intrusion detectors. More particularly, the present invention relates to ceiling mount intrusion detectors with arbitrary direction detection capability.

BACKGROUND

Figure 1A:
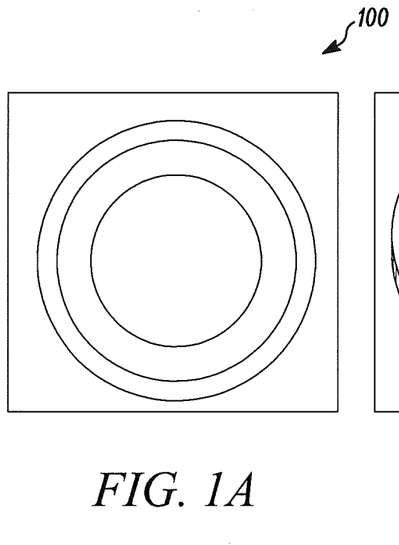
FIG. 1A is a front view of a known Fresnel lens used in ceiling mount detectors known in the art.
Figure 1B:
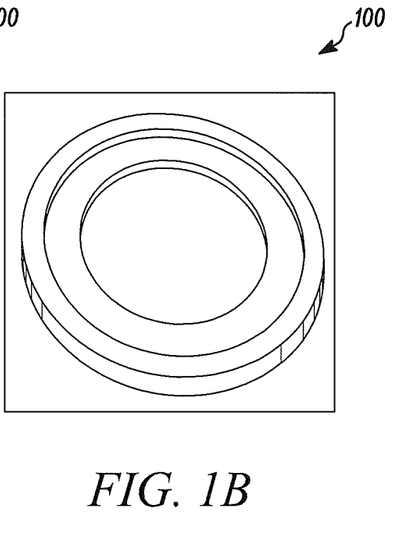
FIG. 1B is a perspective view of a known Fresnel lens used in ceiling mount detectors known in the art.
Figure 1C:
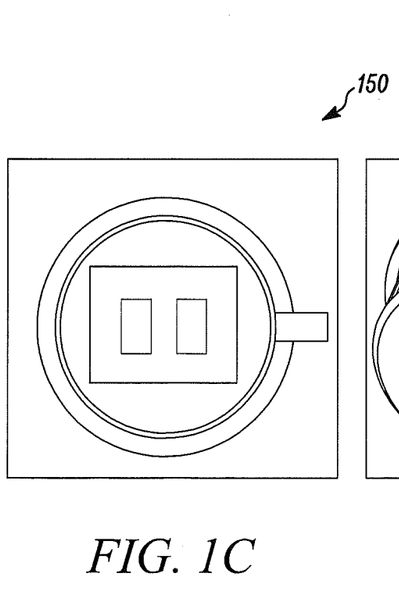
FIG. 1C is a front view of a dual element pyroelectric sensor used in ceiling mount detectors known in the art.
Figure 1D:
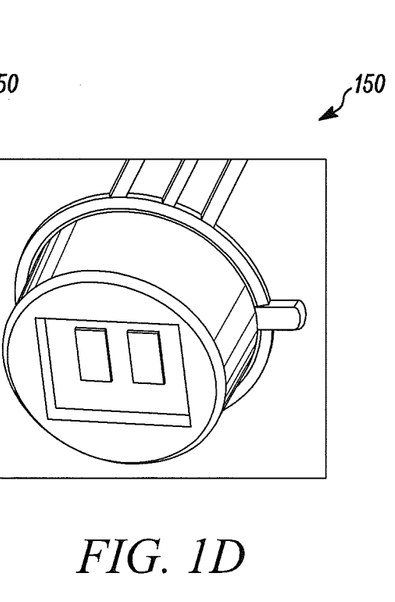
FIG. 1D is a perspective view of a dual element pyroelectric sensor used in ceiling mount detectors known in the art.

Known ceiling mount detectors include a single Fresnel lens and one or more passive infrared (PIR) sensors, such as a dual element pyroelectric sensor. For example, FIG. 1A is a front view of a known Fresnel lens 100 used in known ceiling mount detectors, FIG. 1B is a perspective view of the known Fresnel lens 100 used in known ceiling mount detectors, FIG. 1C is a front view of the dual element pyroelectric sensor 150 used in known ceiling mount detectors, and FIG. 1D is a perspective view of the dual element pyroelectric sensor 150 used in known ceiling mount detectors. As seen in FIG. 1A and FIG. 1B, the known Fresnel lens 100 used in known ceiling mount detectors can include a full, single lens with fully concentric annular sections.

However, known ceiling mount detectors can only detect an alarm condition in some directions. Indeed, pyroelectric sensors are non-rotationally symmetric, causing a look down area of a detector to be non-rotationally symmetric. Because of differences in performance of the pyroelectric sensors in some directions, known ceiling mount detectors miss detecting alarm conditions in a vertical direction. Specifically, the dual element pyroelectric sensor only outputs a strong and clear signal indicative of the alarm condition when energy from the alarm condition, such as an intruder, is detected by a first element of the sensor and then by a second element of the sensor.

Figure 2A:
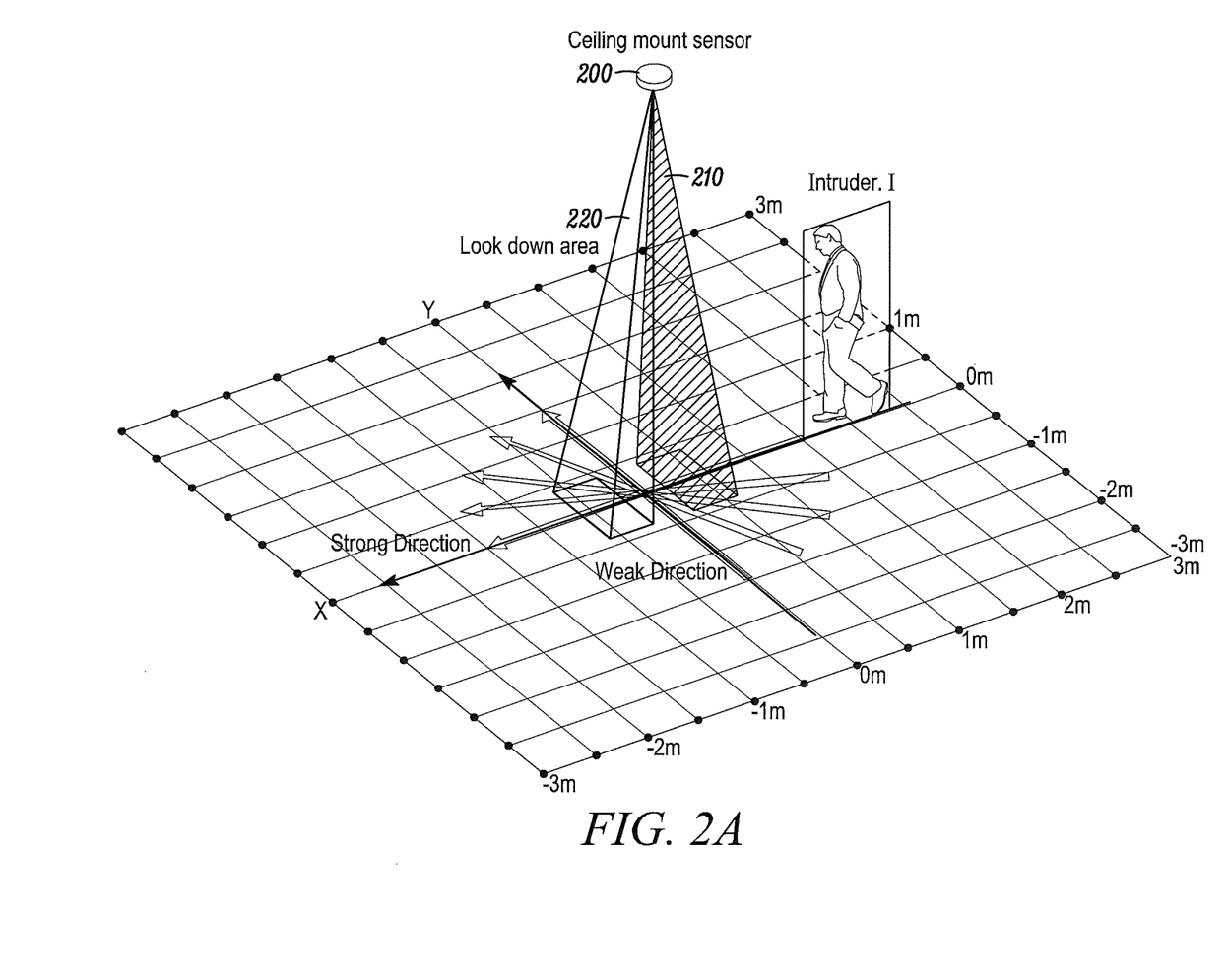
FIG. 2A is perspective view of a detection area pattern projected in a look down area of a ceiling mount detector known in the art.
Figure 2B:
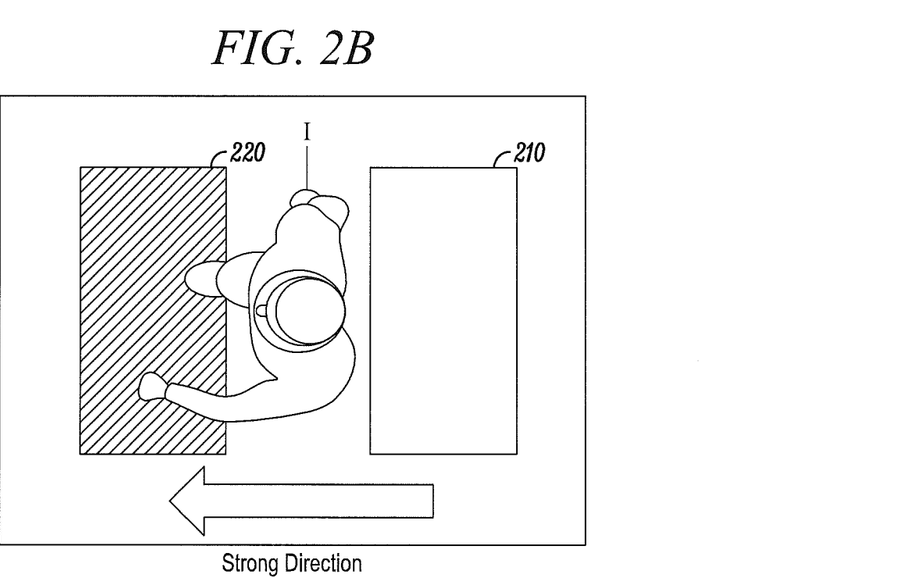
FIG. 2B is a top view of a detection area pattern projected by a ceiling mount detector known in the art.
Figure 2C:
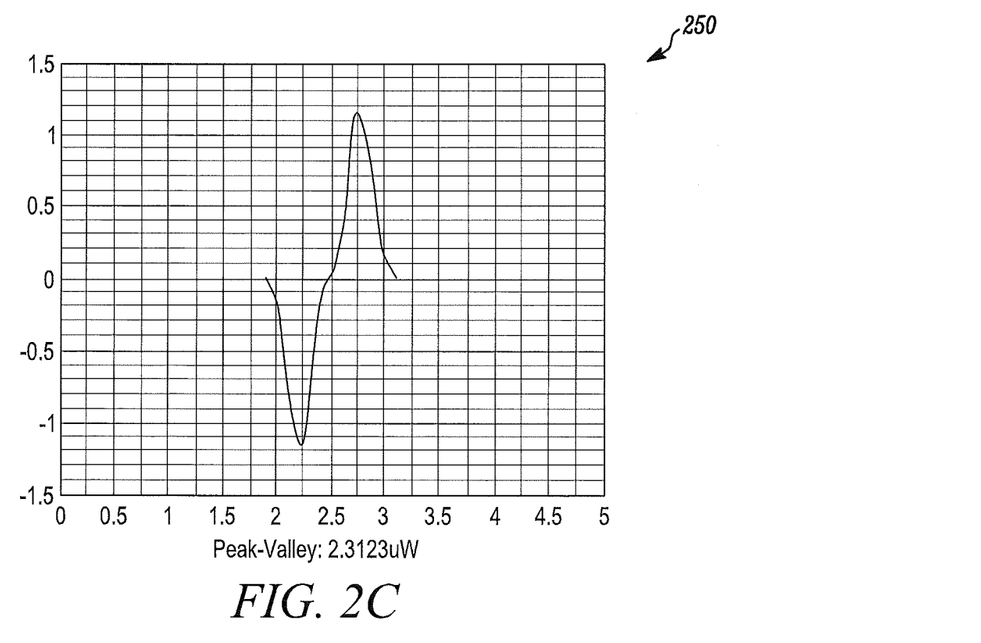
FIG. 2C is a graph of a signal output by a ceiling mount detector known in the art when an intruder passes through a projected detection area pattern at 90° relative to the detector.
Figure 2D:
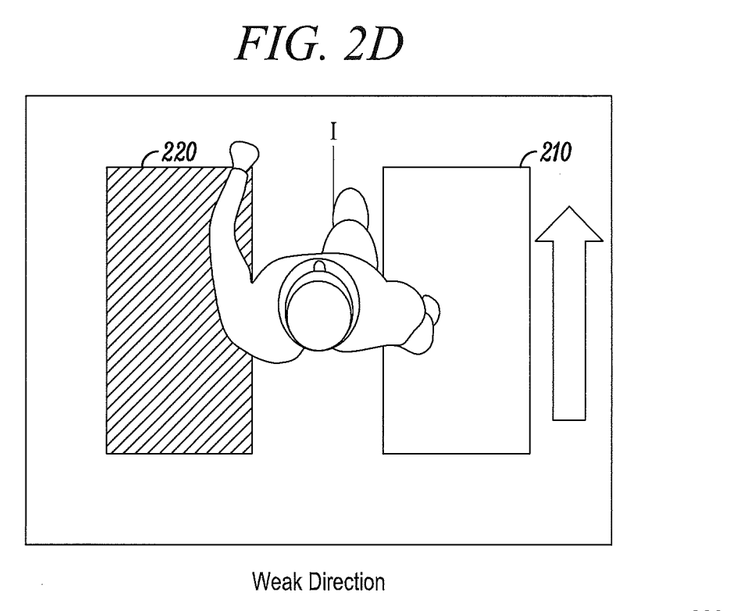
FIG. 2D is a top view of a detection area pattern projected by a ceiling mount detector known in the art.
Figure 2E:
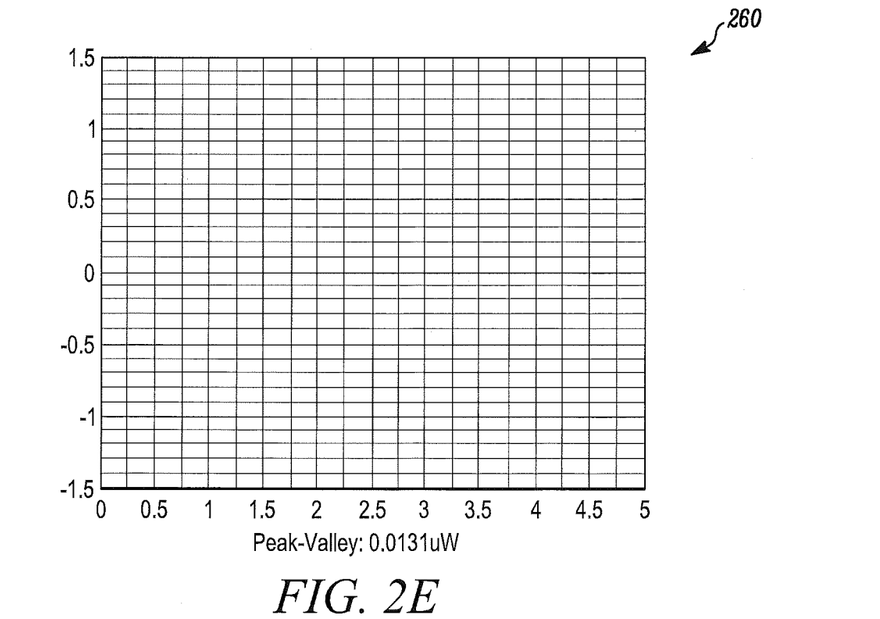
FIG. 2E is a graph of a signal output by a ceiling mount detector known in the art when an intruder passes through a projected detection area pattern at 0° relative to the detector.

For example, as seen in FIG. 2A, the dual element pyroelectric sensor in a known ceiling mount detector 200 projects a positive detection area 210 and a negative detect area 220 into the look down area on the ground. As seen in FIG. 2B, when the intruder I passes from one area 210 to the other area 220 in a direction along a strong X axis (considered to be 90° relative to the sensor), the dual element pyroelectric sensor will output a strong signal, as illustrated on a chart 250 shown in FIG. 2C. However, as seen in FIG. 2D, when the intruder I passes evenly through the positive and negative areas 210, 220 in a direction along a weak Y axis (considered to be 0° relative to the sensor) or does not pass from one area to the other area, the pyroelectric sensor will not output a signal, as illustrated in a chart 260 shown in FIG. 2E, or will output a signal too weak to be detected as indicative of the alarm condition. As discussed herein, quad element pyroelectric sensors have similar limitations.

In view of the above, there is a continuing, ongoing need for an improved ceiling mount detector.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a ceiling mount intrusion detector with arbitrary direction detection capability. That is, in some embodiments, the ceiling mount intrusion detector as disclosed herein can detect an alarm condition in any direction, including in a vertical direction, relative to the detector.

The ceiling mount intrusion detector as disclosed herein can be easy to manufacture in a cost-effective manner. Indeed, in some embodiments, the detector can include a unitary Fresnel lens that includes two pieces of Fresnel lenses spliced or joined together and a pyroelectric sensor, including a dual element, quad element, or multi-element pyroelectric sensor. Furthermore, performance of the detector can meet needs of a user and industry because the sensor can output a strong signal responsive to the alarm condition in any direction relative to the detector, thereby reducing or avoiding missed alarm conditions.

In accordance with disclosed embodiments, the ceiling mount intrusion detector can include the unitary Fresnel lens that includes a first piece of a first full Fresnel lens and a second piece of a second full Fresnel lens spliced or joined together. Each piece of Fresnel lens can be spliced so that it includes only a piece of a respective full Fresnel lens and so that it includes only portions of concentric annular sections of the respective full Fresnel lens. In some embodiments, each of the first and second pieces of Fresnel lens can have a same focal length (FL). Furthermore, in some embodiments, in order to optimize performance of the pyroelectric sensor included in the detector, a distance Lx between centers of each piece of lens along a strong X axis and a distance Ly between centers of each piece of lens along a weak Y axis can be determined by at least some of the FL, a mount height (MH) of the detector, a width of likely intruders, and a size Wp and distance Wp between elements of the pyroelectric sensor included in the detector. FIG. 7D illustrates dimensions Lx and Ly on the unitary Fresnel lens 700 in accordance with disclosed embodiments.

Figure 3:
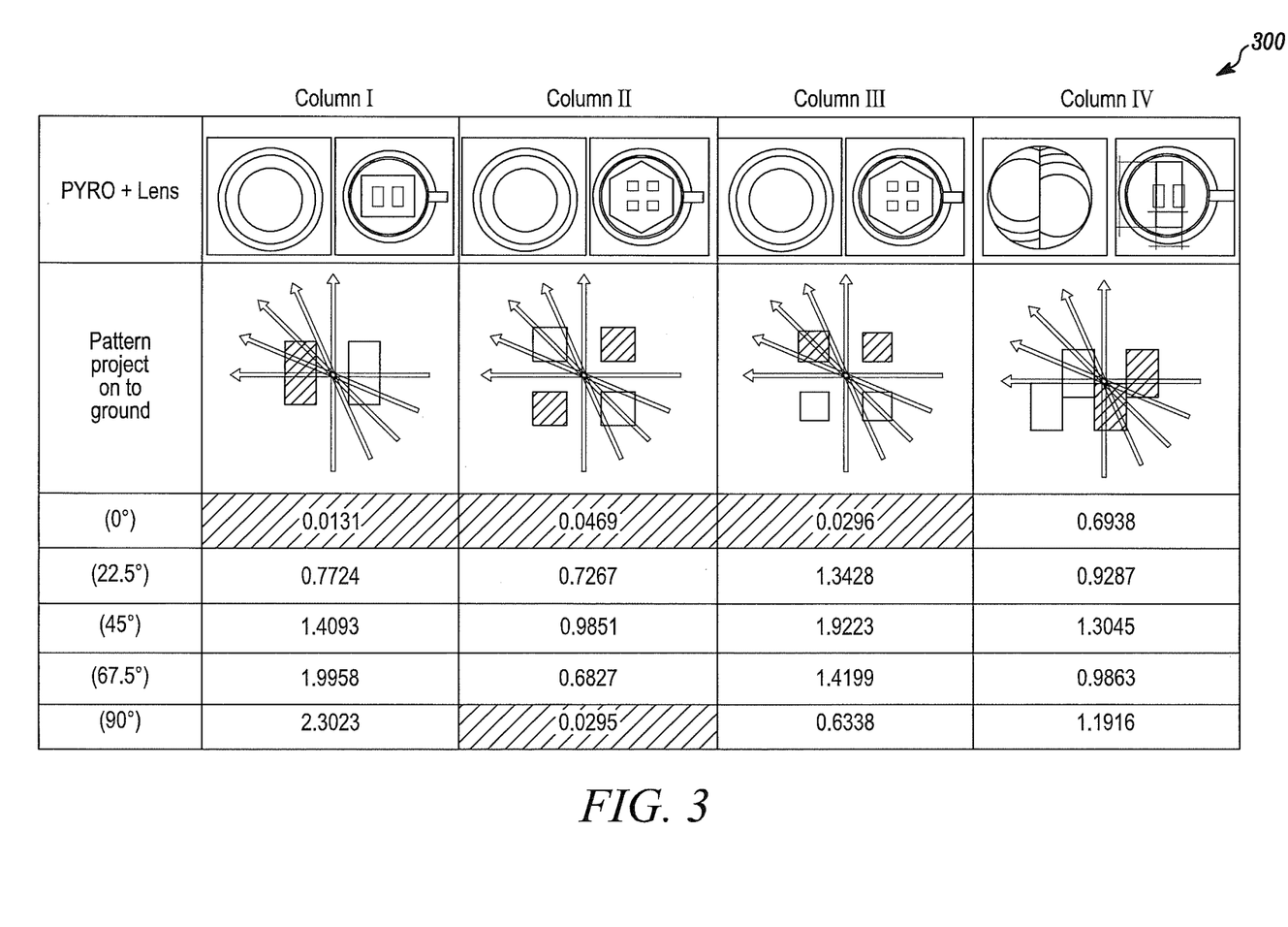
FIG. 3 is a chart of signal values output by a ceiling mount detector according to a type of Fresnel lens and pyroelectric sensor included and according to an angle at which an intruder passes through a projected detection area pattern relative to the detector.
Figure 4:
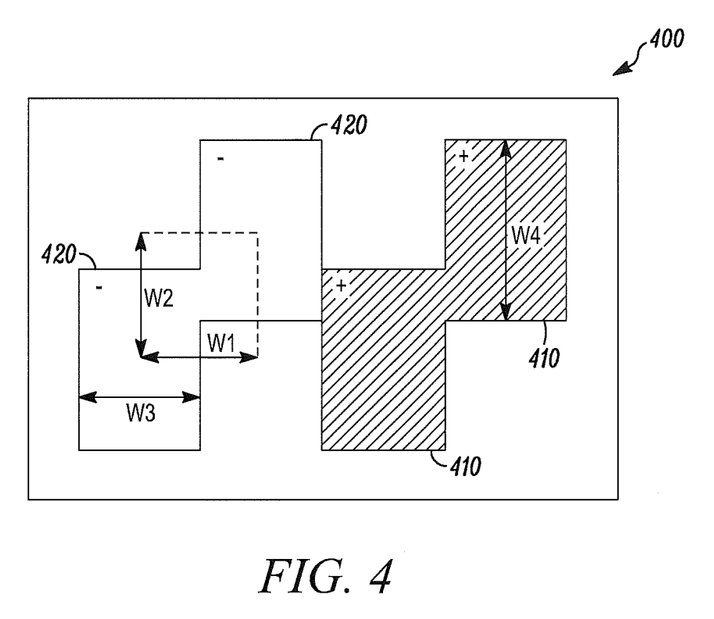
FIG. 4 is a top view of a projected detection area pattern of a ceiling mount detector in accordance with disclosed embodiments.
Figure 5:
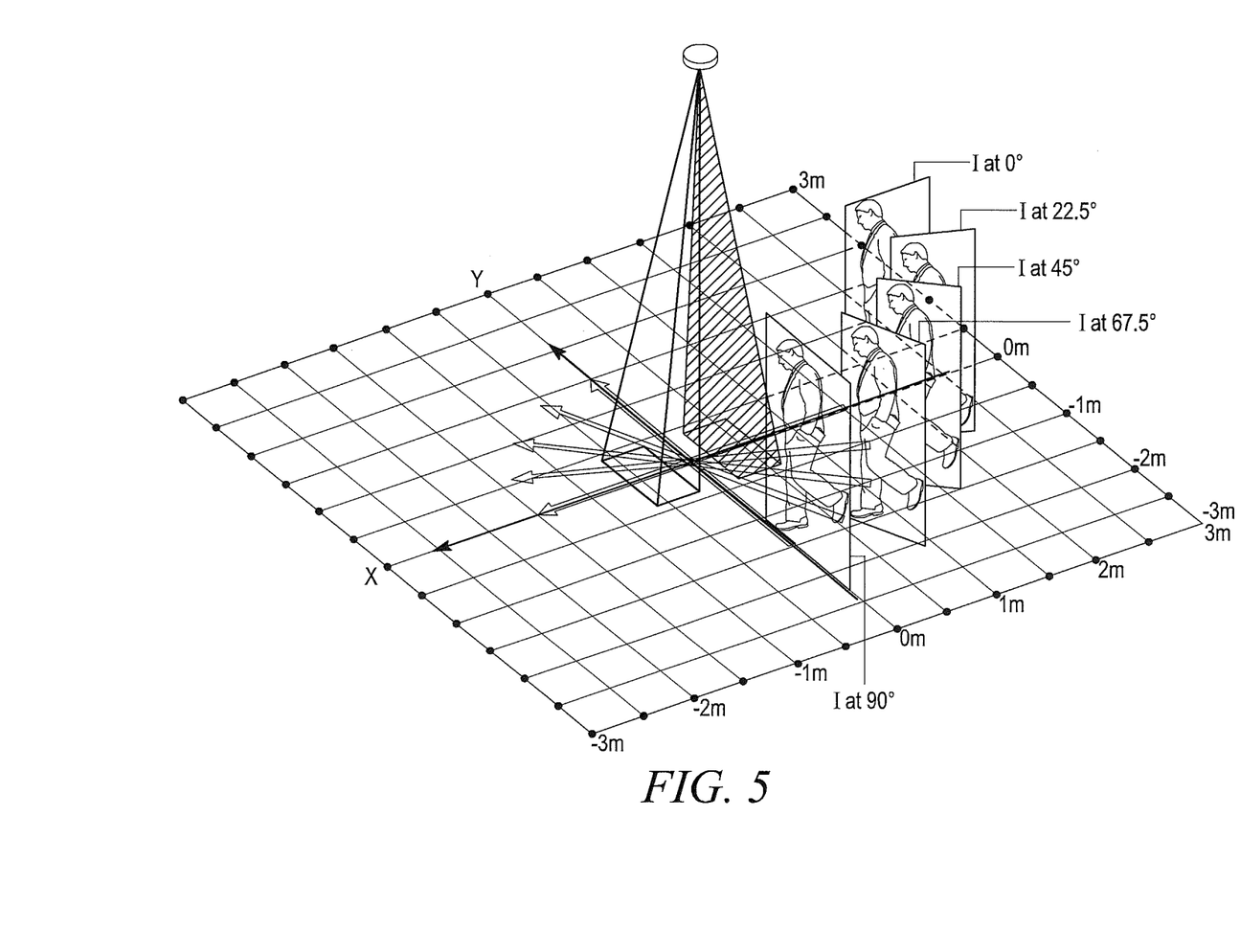
FIG. 5 is a perspective view of a detection area pattern projected in a look down area of a ceiling mount detector and angles at which an intruder passes through the projected detection area pattern relative to the detector.

As shown in a chart 300 in FIG. 3, advantages can be achieved when the pyroelectric sensor included in the detector as disclosed herein can project a detection area pattern 400 shown in FIG. 4. As seen in FIG. 5, the intruder I can pass through a look down area of the ceiling mount detector 500 at any arbitrary angle relative to the pyroelectric sensor of the detector, including at 0° (along a direction of the strong X axis), 22.5°, 45°, 67.5°, and 90° (along a direction of the weak Y axis).

As seen in Column I of FIG. 3, when a dual element pyroelectric sensor is employed with a known single Fresnel lens, the detection area pattern includes two detection areas. However, when the intruder passes through the look down area at 0° relative to the sensor, a peak-to-valley signal value output by the sensor is only 0.0131 µW. As seen in Columns II and III of FIG. 3, when a quad element pyroelectric sensor is employed with the known single Fresnel lens, the detection area pattern includes four detection areas in one of the orientations shown. However, when the intruder passes through the look down area at 0° relative to the sensor, the peak-to-valley signal value output by the sensor is only 0.0469 µW or 0.0296 µW. Moreover, in one orientation of the detection area pattern produced by the quad element pyroelectric sensor with the known single Fresnel lens, the peak-to-valley signal output by the sensor is only 0.0295 µW when the intruder passes through the look down area at 90° relative to the sensor. It is to be understood that, because the detection area patterns of the dual element pyroelectric sensor and the quad element pyroelectric element employed with the known single Fresnel lens are symmetrical, it is sufficient to review signal values when the intruder passes through the look down area at 0°-90°.

Figure 6A:
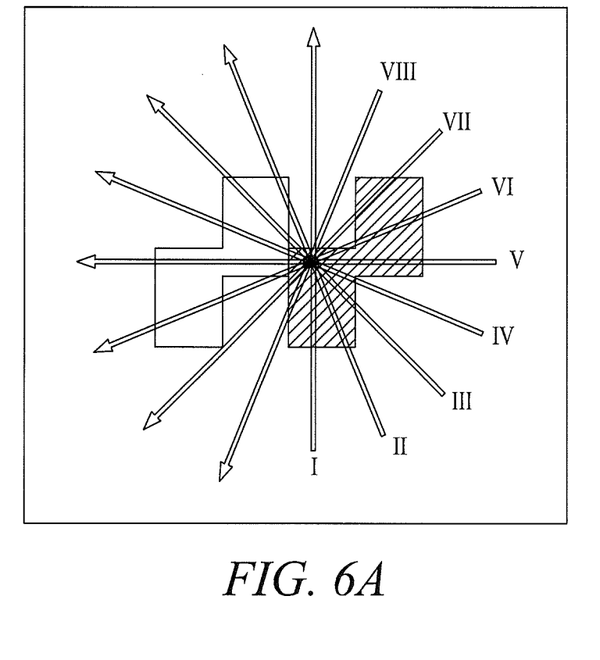
FIG. 6A is a top view of a projected detection area pattern of a ceiling mount detector in accordance with disclosed embodiments and angles at which an intruder passes through the projected detection area pattern relative to the detector.
Figure 6B:
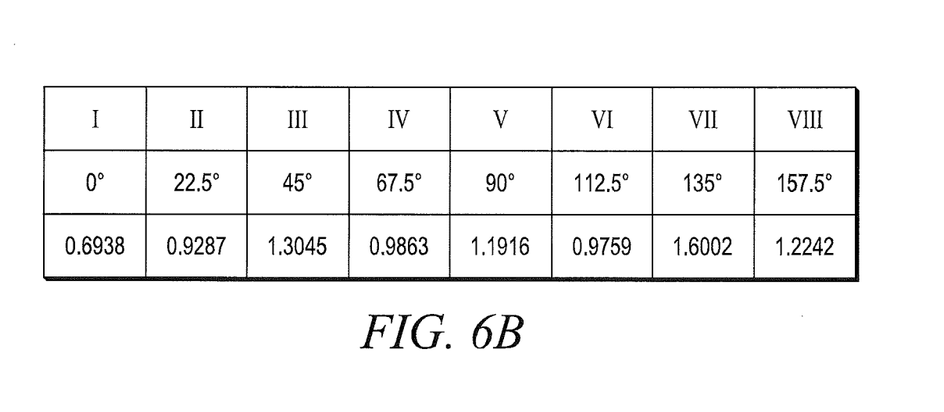
FIG. 6B is a chart of signal values output by a ceiling mount detector that includes a unitary Fresnel lens in accordance with disclosed embodiments according to an angle at which an intruder passes through a projected detection area pattern relative to the detector.

It is known that a value of the peak-to-valley signal output by the pyroelectric sensor must be at least 0.3 µW for the detector to identify the signal as being indicative of the alarm condition rather than noise. As seen in Column IV of FIG. 3, peak-to-valley signal values output by the pyroelectric sensor used in connection with the unitary Fresnel lens as disclosed herein can satisfy this requirement. Indeed, embodiments disclosed herein can balance a strength of the signal output by the sensor along different directions to ensure that the ceiling mount detector can detect the intruder in any arbitrary direction of the look down area. Because the detection area pattern of the pyroelectric sensor used in connection with the unitary Fresnel lens as disclosed herein is not symmetric, additional signal values when the intruder passes through the look down area at 0°-180° can be reviewed and, as seen in FIG. 6A and FIG. 6B, can have a satisfactory value at each angle.

As explained above, it is desirable for the pyroelectric sensor included in the detector as disclosed herein to project the detection area pattern 400 shown in FIG. 4. As seen in FIG. 4, the detection area pattern 400 can include four detection areas of equal size—two positive detection areas 410 and two negative detection areas 420. Each of the detection areas can have an equal size, can span a distance W3 in a strong X axis direction, and can span a distance W4 in a weak Y axis direction. W1 can be a distance between centers of each of the positive detection areas 410 in the strong X axis direction or between centers of each of the negative detection areas 420 in the strong X axis direction. Similarly, W2 can be a distance between the centers of each of the positive detection areas 410 in the weak Y axis direction or between the centers of each of the negative detection areas 420 in the weak Y axis direction. In some embodiments W1=W3, and in these embodiments, neither positive detection area 410 overlaps with either negative detection area 420, resulting in high energy efficiency in the sensor. In some embodiments, the detection area pattern 400 projected by the sensor can be asymmetric in at least one or more directions.

Figure 7A:
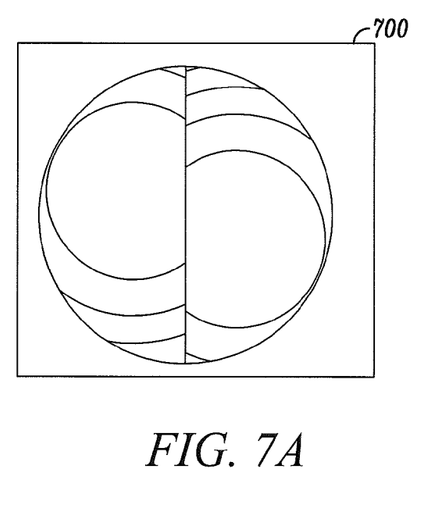
FIG. 7A is a front view of a Fresnel lens in accordance with disclosed embodiments.
Figure 7B:
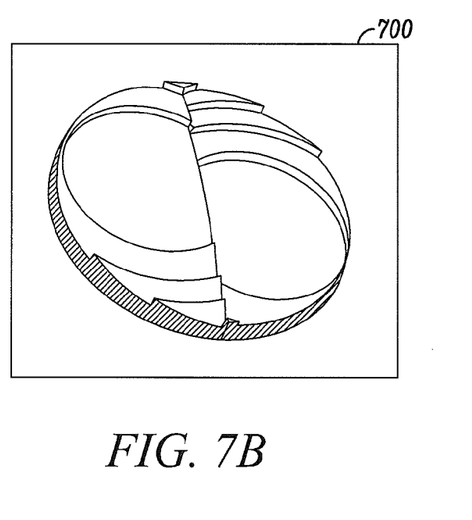
FIG. 7B is a perspective view of a Fresnel lens in accordance with disclosed embodiments.
Figures 7C, 7D:
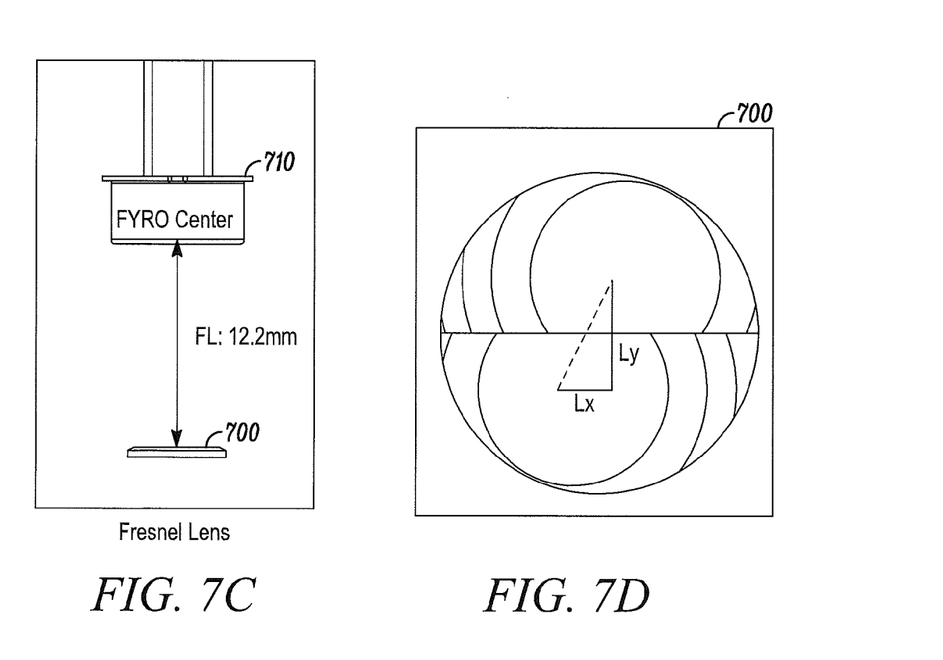
FIG. 7C is a side view of a Fresnel lens in accordance with disclosed embodiments relative to a pyroelectric sensor included in an associated ceiling mount detector.
FIG. 7D is a front view of a Fresnel lens in accordance with disclosed embodiments illustrating dimensions Lx and Ly of the lens.

The unitary Fresnel lens 700 as disclosed herein, and as seen in FIGS. 7A and 7B, can be placed in front of an exemplary pyroelectric sensor 710 as seen in FIG. 7C. Although the pyroelectric sensor 710 shown and described herein is the dual element pyroelectric sensor and the detection area pattern shown and described herein is produced by the dual element pyroelectric sensor, it is to be understood that embodiments disclosed are not so limited. Instead, the quad or multi element pyroelectric sensor can be used in connection with the unitary Fresnel lens 700 as disclosed herein to produce the detection area pattern with the dimensions that satisfy requirements of embodiments disclosed herein.

Figure 8A:
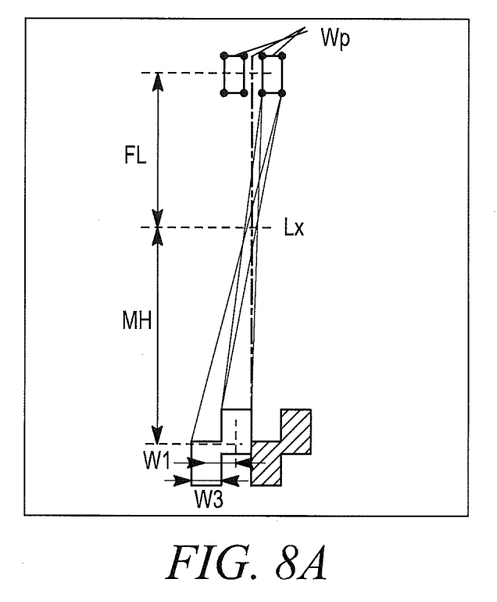
FIG. 8A is graphical representation of dimensions of a ceiling mount detector in accordance with disclosed embodiments in a strong X axis direction.
Figure 8B:
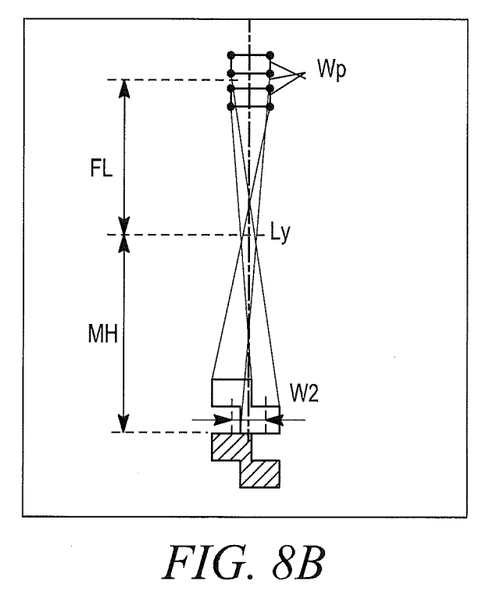
FIG. 8B is a graphical representation of dimensions of a ceiling mount detector in accordance with disclosed embodiments in a weak Y axis direction.

Exemplary relationships between the unitary Fresnel lens 700, the pyroelectric sensor 710, and the projected detection area patterns in the strong X axis direction and the weak Y axis direction are shown in FIG. 8A and FIG. 8B, respectfully. For example, due to known geometric relationships, the following equations are applicable:

$$Wp/FL = W3/MH \qquad \text{Equation 1}$$

$$W1/(MH+FL) = Lx/FL \qquad \text{Equation 2}$$

$$W2/(MH+FL) = Ly/FL \qquad \text{Equation 3}$$

Accordingly, when W1=W3, Equation 4 and Equation 5 are applicable:

$$Lx = (Wp \times MH)/(MH+FL) \qquad \text{Equation 4}$$

$$Ly = W2/(MH+FL) \qquad \text{Equation 5}$$

For known dual element pyroelectric sensors, Wp is approximately 1 mm, and in some embodiments, Lx can be approximately Wp. That is, in some embodiments, Lx can be approximately 1 mm.

In some embodiments, when W2 is greater than 0.3 Wp, advantageous results can be achieved. Furthermore, in some embodiments, when W2=1.1 W1, advantageous results can be achieved, and in some embodiments, Ly can be approximately 1.1 mm to achieve advantageous results.

The ceiling mount detector as disclosed herein can be designed to achieve advantageous and desired results. Accordingly, in accordance with the above, in some embodiments, the FL of each piece of the unitary Fresnel lens 700 and a distance between the unitary Fresnel lens 700 and a center of the pyroelectric sensor 710 can be approximately 12.2 mm.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A ceiling mount detector comprising:
   a pyroelectric sensor; and
   a unitary Fresnel lens,
   wherein the unitary Fresnel lens includes a first piece of a first full Fresnel lens and a second piece of a second full Fresnel lens,
   wherein the first piece and the second piece are spliced together
   wherein the pyroelectric sensor projects a detection area pattern onto a ground, via the unitary Fresnel lens, and
   wherein the detection area pattern is asymmetric in at least one direction.

2. The ceiling mount detector as in claim 1 wherein neither the first piece nor the second piece includes a fully concentric annular section.

3. The ceiling mount detector as in claim 1 wherein each of the first piece and the second piece includes a same focal length.

4. The ceiling mount detector as in claim 1 wherein Lx is a first distance between a center of the first piece and a center of the second piece in a first direction, wherein Ly is a second distance between the center of the first piece and the center of the second piece in a second direction, and wherein Lx and Ly are determined by a focal length of the first piece and the second piece.

5. The ceiling mount detector as in claim 1 wherein Lx is a first distance between a center of the first piece and a center of the second piece in a first direction, wherein Ly is a second distance between the center of the first piece and the center of the second piece in a second direction, and wherein a focal length of the first piece and the second piece are determined by Lx and Ly.

6. The ceiling mount detector as in claim 1 wherein the pyroelectric sensor outputs a first signal indicative of an alarm condition when an object passes in front of the unitary Fresnel lens at any angle relative to the pyroelectric sensor.

7. The ceiling mount detector as in claim 6 wherein the first signal indicative of the alarm condition has a value higher than a second signal indicative of noise.

8. The ceiling mount detector as in claim 7 wherein the first signal indicative of the alarm condition has a value of at least 0.3 µW.

9. A ceiling mount detector comprising:
   a dual element pyroelectric sensor; and
   a unitary Fresnel lens,
   wherein the unitary Fresnel lens includes a first piece of a first full Fresnel lens and a second piece of a second full Fresnel lens,
   wherein the first piece and the second piece are spliced together,
   wherein the dual element pyroelectric sensor projects a detection area pattern onto a ground, via the unitary Fresnel lens,
   wherein the detection area pattern includes first and second positive detection areas and first and second negative detection areas, and
   wherein each of the first and second positive detection areas and the first and second negative detection areas are equal in size and do not overlap.

10. The ceiling mount detector as in claim 9 wherein neither the first piece nor the second piece includes a fully concentric annular section.

11. The ceiling mount detector as in claim 9 wherein each of the first piece and the second piece includes a same focal length.

12. The ceiling mount detector as in claim 9 wherein Lx is a first distance between a center of the first piece and a center of the second piece in a first direction, wherein Ly is a second distance between the center of the first piece and the center of the second piece in a second direction, and wherein Lx and Ly are determined by a focal length of the first piece and the second piece.

13. The ceiling mount detector as in claim 9 wherein Lx is a first distance between a center of the first piece and a center of the second piece in a first direction, wherein Ly is a second distance between the center of the first piece and the center of the second piece in a second direction, and wherein a focal length of the first piece and the second piece are determined by Lx and Ly.

14. The ceiling mount detector as in claim 9 wherein the dual element pyroelectric sensor outputs a signal indicative of an alarm condition when an object passes in front of the unitary Fresnel lens at any angle relative to the dual element pyroelectric sensor.

* * * * *